United States Patent [19]

Ferguson et al.

[11] Patent Number: 5,182,566
[45] Date of Patent: Jan. 26, 1993

[54] METHOD AND APPARATUS FOR UTILIZING A MOVABLE GPS ANTENNA FOR SURVEYING PURPOSES

[75] Inventors: James Ferguson, Old Chelsea; Luc Pelletier, Quebec, both of Canada

[73] Assignees: GEOsurv, Inc.; Photocompilation PMS, Inc., Ontario, Canada

[21] Appl. No.: 769,727

[22] Filed: Oct. 2, 1991

[51] Int. Cl.[5] ............ G01S 5/02; H01Q 1/28; H01Q 1/12

[52] U.S. Cl. .................. 342/357; 343/705; 343/878

[58] Field of Search ........... 342/357; 343/705, 708, 343/713, 878, 892, 888, 889; 218/535, 538, 581

[56] References Cited

U.S. PATENT DOCUMENTS

| | | | |
|---|---|---|---|
| 3,100,555 | 8/1963 | Ashton | 343/878 |
| 3,701,157 | 10/1972 | Uhrig | 343/708 |
| 4,588,147 | 5/1986 | Lindsey, Jr. | 343/705 |
| 4,799,067 | 1/1989 | Tekip et al. | 343/890 |
| 4,814,711 | 3/1989 | Olsen et al. | 342/357 |
| 5,049,896 | 9/1991 | Conley | 343/888 |
| 5,052,645 | 10/1991 | Hixon | 343/883 |

OTHER PUBLICATIONS

MacDoran et al., "Codeless GPS Systems for Positioning of Offshore Platforms and 3D Seismic Surveys", Navigation: Jnl of the Inst. of Nav. vol. 31, #2 1984 pp. 57–69.

Primary Examiner—Gregory C. Issing
Attorney, Agent, or Firm—Dickinson, Wright, Moon, Van Dusen & Freeman

[57] ABSTRACT

A method for obtaining Global Positioning System (GPS) information for a required point on the earth's surface, the method comprising: positioning a GPS receiving antenna on a known point, beginning to record received GPS signals and thereafter continuously recording the signals, removably mounting the antenna on a rotary wing aircraft, moving the aircraft to a position proximate the required point, removing the antenna from the aircraft and positioning the antenna on the required point.

26 Claims, 3 Drawing Sheets

METHOD AND APPARATUS FOR UTILIZING A MOVABLE GPS ANTENNA FOR SURVEYING PURPOSES

FIELD OF THE INVENTION

This invention relates to a method for surveying which utilizes a movable GPS antenna and a mounting structure for mounting the antenna on a rotary wing aircraft.

BACKGROUND OF THE INVENTION

The satellites of the global positioning system (GPS) are of substantial assistance to surveyors. Once a mobile GPS antenna is set up on a known point on the earth's surface, and a static GPS system is placed nearby on another known point, the mobile antenna can be moved and another location of the antenna can be precisely determined, so long as the flow of signals between the satellite and the antennas has been uninterrupted during the move. The antenna can thus be moved to a point the exact location of which is required. This is normally known as kinematic GPS and employs A complicating factor is that the antenna frequently cannot be placed precisely on the point whose position is required.

It is thus necessary in that situation to carry out the entirely separate and complicated procedure of locating the antenna relative to the known point and then to the desired point before the GPS information can be utilized.

This last requirement is a very time consuming and expensive one. This is particularly the case if one were to use a rotary wing aircraft such as a helicopter for transporting the GPS antenna. For example, if a survey is being done on an extended scale such as in the final laying out of electric power transmission lines, a large number of survey pins which will earlier have been installed by a ground survey team, must be given precise positions. The cost for the helicopter would be very substantially increased by the requirement for relating each survey pin position to the position to the antenna on the helicopter, due to the time lost for this step.

An even more basic problem exists in respect of the helicopter usage, since it is generally considered that many GPS antenna designs cannot be mounted under some types of helicopter rotors, because the spinning blades will interrupt the signal from the satellite.

Against this background, a method and apparatus has been developed which enables the GPS antenna to be mounted under the rotor of a helicopter and to be mounted in a removable manner so that the antenna itself can be precisely placed on a known and required position.

PRIOR ART

Applicant is unaware of any prior documents which pertain to the subject matter of the invention. As indicated, it has generally not been possible to readily locate in a movable manner, a GPS antenna under a rotor of a rotary wing aircraft.

SUMMARY OF THE INVENTION

It has now been determined that a GPS antenna can be mounted beneath the rotor of a rotary wing aircraft. It has been found that for a given speed of rotation of the rotor, a minimum radius can be determined from a center of the rotor assembly beyond which the rotating blades will not interfere with the GPS signals received from a satellite.

A method has been developed by which the antenna is removably mounted in position on a helicopter in such a way that the antenna can be placed directly on a known point or on a point whose position is to be determined while continuing to feed signals into a recording device in the helicopter.

Thus, the invention provides a method for obtaining global positioning system (GPS) information for a required point on the earth's surface, the method comprising positioning a GPS receiving antenna on a known point relative to a simultaneously operating static base station, beginning to record received GPS signals and thereafter continuously recording said signals. Thereafter, the antenna is removably mounted on a rotary wing aircraft and the aircraft moved to a position proximate the required point. The antenna is removed from the aircraft and the antenna positioned on the required point.

The invention further comprises an apparatus for mounting con a rotary wing aircraft for supporting a Global Positioning System (GPS) receiving antenna, the apparatus comprising a boom structure fixed to and extending laterally from a side of the aircraft, and mounting means on the boom for cooperating with corresponding mounting means on said antenna for removably mounting the antenna on the boom.

GENERAL DESCRIPTION OF THE INVENTION

It had generally been felt that the positioning of a GPS receiving antenna under the rotors of a rotary wing aircraft such as a helicopter would not be feasible because the spinning blades would interfere with the reception of signals from a GPS satellite. As indicated above, the reception of signals must be continuous. How this problem could be overcome was determined empirically by the simple expedient of positioning a hand-held antenna under the spinning rotor assembly of a helicopter and moving it radially of the rotor assembly to determine the point at which interference ceased.

In a similar manner empirical data was gathered for different speeds of rotation of the rotor assembly.

Using this approach, one can determine for a specific type of helicopter the point at which an antenna can be mounted to operate without interference at a specified speed of rotation of the rotor assembly.

Mainly because of safety considerations, it is impractical to mount the antenna rearwardly of the cabin section of the aircraft. Similarly, because the helicopter's standard antenna will frequently be mounted to protrude forwardly of the cabin, it is impractical to mount the GPS antenna in that position. Accordingly, the mounting will normally require a boom structure extending laterally from the fuselage of the cabin section of the aircraft.

For visual monitoring the pilot will normally want to have the boom structure on the pilot's side of the aircraft.

The boom structure in the present invention comprises a group of elongated rigid tubular members which are fixed at one end to the fuselage and which are joined at the outer end to form an antenna support. Interbracing is provided between the tubular members and a series of support cables are run from the boom structure to the aircraft.

At the outer end of the boom structure, a mount is provided for receiving a GPS antenna in a removable manner. A retractable cable is run from the aircraft to the antenna, so that the antenna can be removed from its mount and hand carried a required distance from the aircraft while continuing to receive signals and transmit data to a recording device on the aircraft.

In the preferred configuration the mount for the antenna comprises a vertically oriented tubular member which is provided with a locking pin. A co-operating tubular member is located on the antenna itself. The tubular members are telescoped together and locked in place by means of the locking pin.

Thus, in operation the helicopter is landed near a known point, such as a permanent survey marker on which a static antenna has been placed. The helicopter antenna is removed from its mount by a crew member, who then places it on an arbitrary point near the survey pin. After about one minute the two antennas are swapped and left static for one minute. They are then swapped once more, returning them to their original configuration. After one minute, the helicopter can fly away from the initialization site. This is a standard initialization procedure known as antenna swap.

The helicopter is then moved to a position adjacent a point for which the precise location is required. The crewman then repeats the process of removing the antenna from the mount, placing it on the required position, recording the necessary GPS data and then replacing the antenna on its mount.

The helicopter can then move directly to the next point.

Initialization methods other than antenna swap may be used.

During the survey the position of the mobile antenna relative to base is monitored, usually at 0.5 to second intervals.

Utilizing this apparatus and method, the cost saving in conducting the survey is very great. As well, the chance of error is reduced and accuracy enhanced.

BRIEF DESCRIPTION OF THE DRAWINGS

These and other objects and advantages of the invention will become apparent upon reading the following detailed description and upon referring to the drawings in which.

Figure 1:
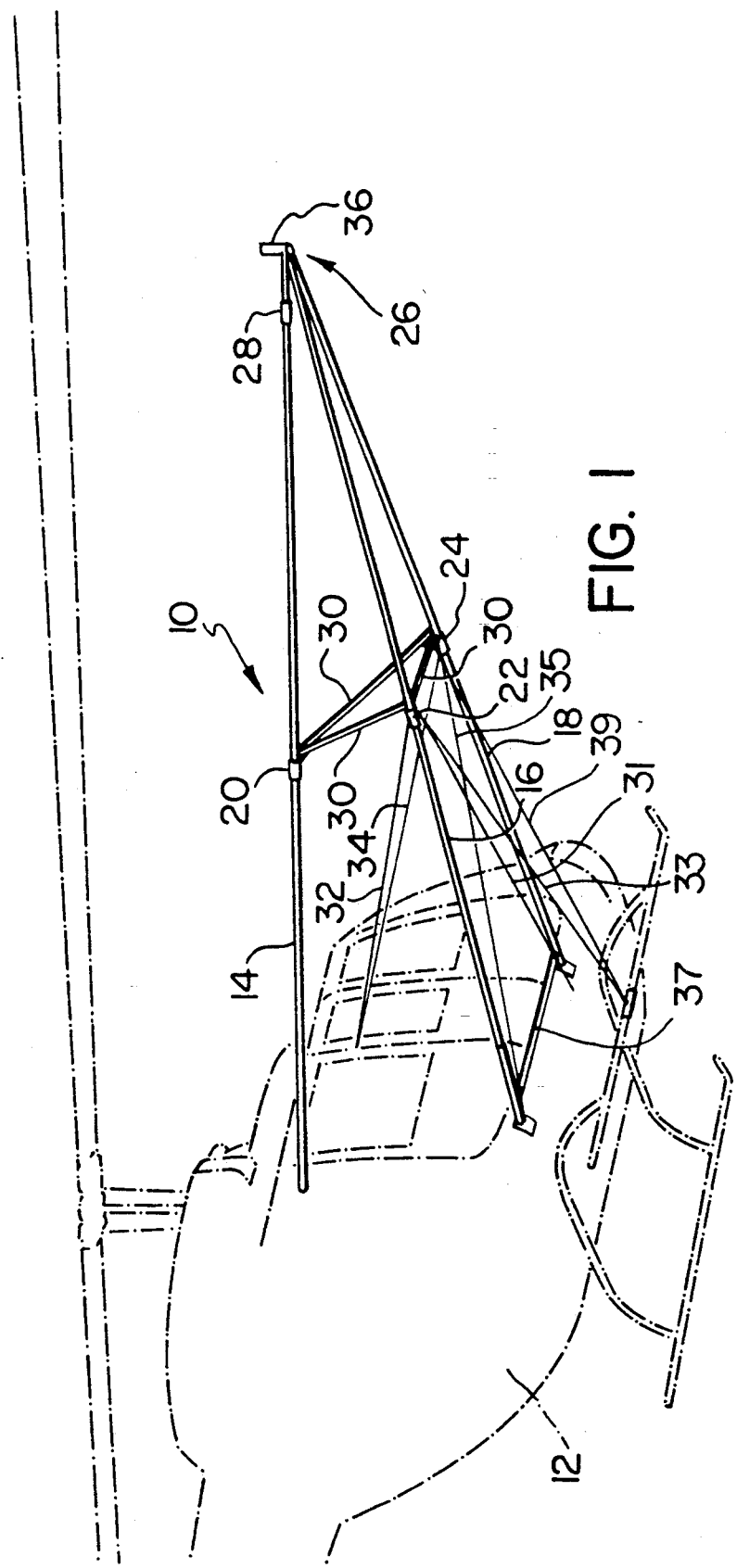
FIG. 1 is perspective view of a boom structure according to the invention.
Figure 2:
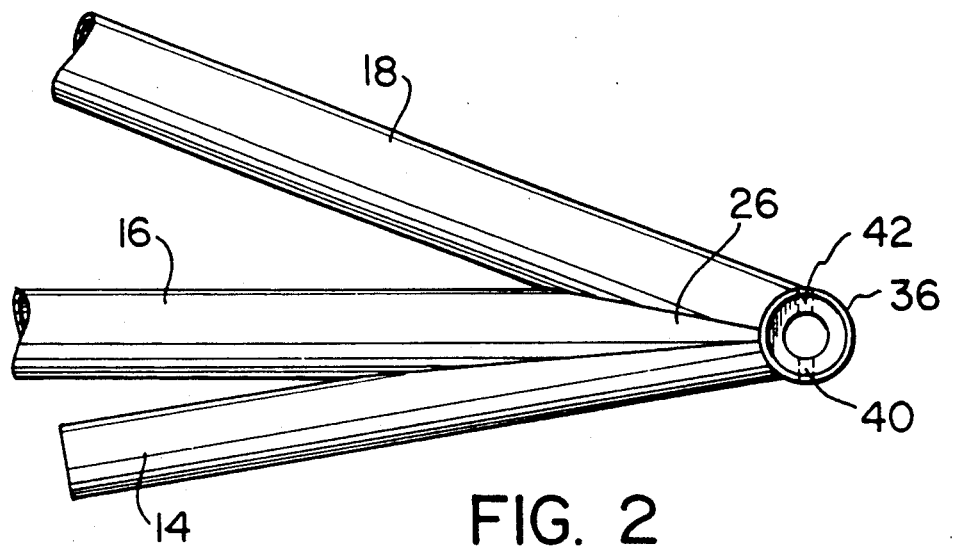
FIG. 2 is a top plan view of the outer end of the boom structure of FIG. 1.
Figure 3:
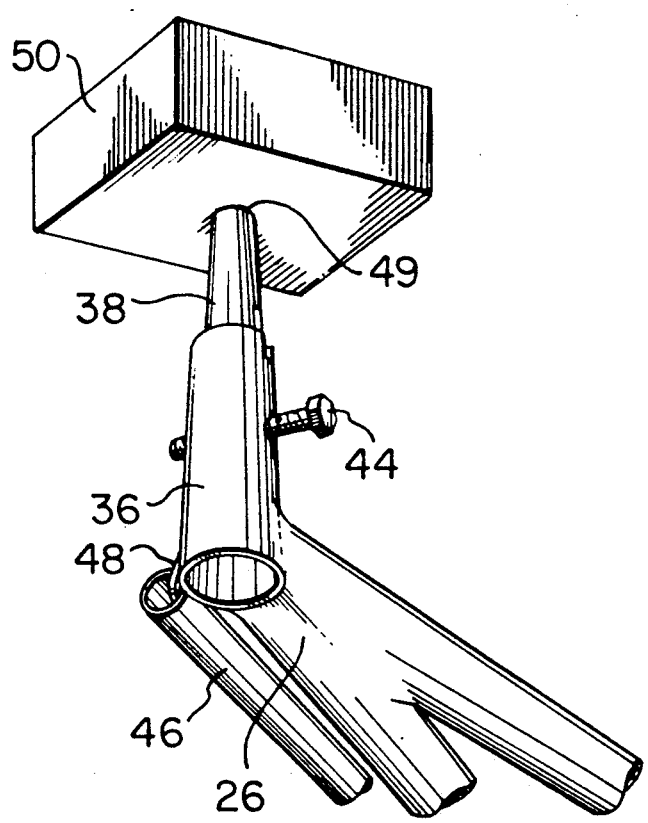
FIG. 3 is a perspective view of the outer end of the boom of FIG. 1 with an antenna in place.
Figure 4:
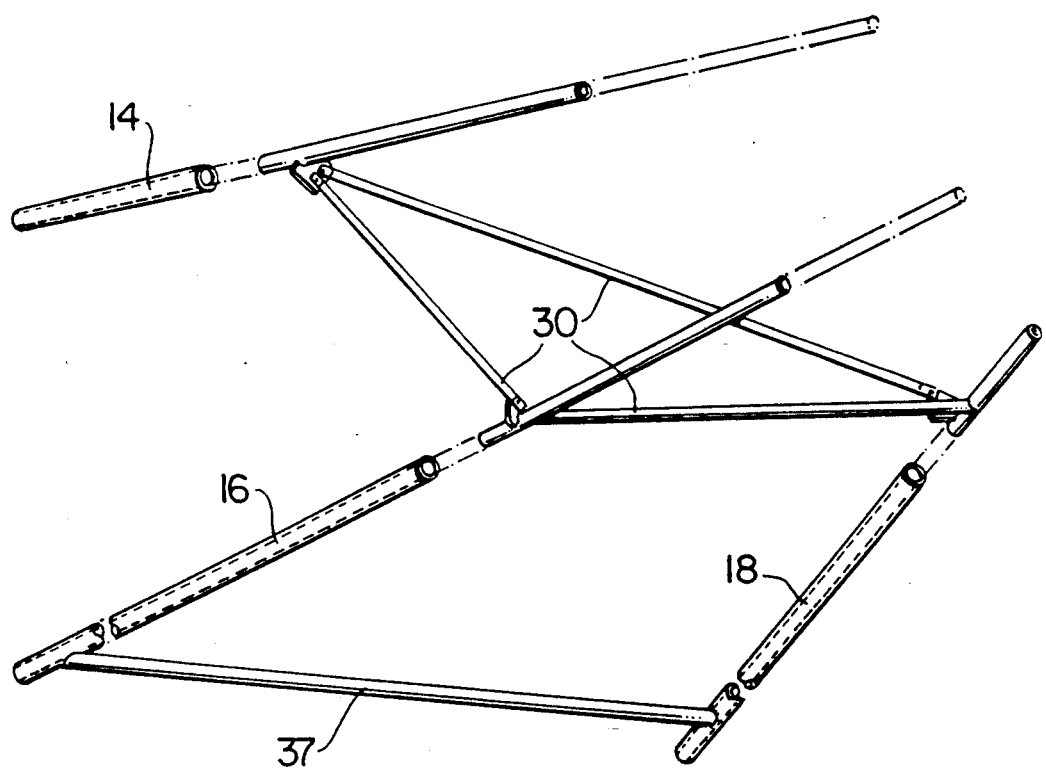
FIG. 4 illustrates a bracing structure for use in the boom of FIG. 1.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The drawings illustrate a typical installation which is suitable for use on a Bell 206 Long Ranger helicopter.

The boom structure 10 which is secured to the helicopter 12 comprises a group of outwardly extending tubular members 14, 16 and 18. For purposes of disassembly and handling, each of the tubular members 14, 16 and 18 is preferably in two parts joined by sleeve members 20, 22 and 24 respectively. Members 14, 16 and 18 are preferably welded together to form outer end 26 of boom structure 10. Tubular member 14 is preferably further divided toward outer end 26 with the sections being held together by sleeve member 28.

The structure thus can be demounted from helicopter 12 and disassembled for storage without undue bulk.

A set of tubular spreaders or support members are interposed between members 14, 16 and 18 to provide the triangular spreader structure 30.

A set of three support cables 31, 32 and 33, and a second set of three support cables 34, 35 and 39 extend from sleeve members 22 and 24 on tubular members 16 and 18 respectively to suitable attachment points on helicopter 12.

A reinforcing strut 37 extends between tubular members 16 and 18 adjacent to helicopter 12.

In a preferred configuration the members 16 and 18 extend outwardly and upwardly from hard points 17 and 19 on the fuselage of aircraft 12. Member 14 extends rearwardly from outer end 26 of boom structure 10 to hard point 15 on the fuselage of aircraft 12.

In a preferred arrangement of the support cables, the cables 31 and 34 are a crossed pair connected at hard points 19 and 17 respectively. Cables 32 and 35 are connected to hard point 41. Final cable pair 33 and 39 are connected to a point 43 intermediate the ends of skid 45 of aircraft 12.

A mounting means for a GPS antenna is fixed to the outer end 26 of boom structure 10. In a preferred embodiment the mounting means comprises a vertically oriented tubular member 36. A co-operating member 38 is provided in threaded engagement at 49 with antenna 50 to be inserted in telecoping fashion in tubular member 36. Openings 40 and 42 are provided in the member 36 for alignment with a transverse bore (not illustrated) in member 38 for the insertion of a locking pin 44. Various forms of quick release locking pin can be used for this purpose.

An adaptor (not illustrated) may be provided for supporting member 38 on a survey tripod or rangepole or other suitable device when being positioned over a point.

As indicated above, the length of the boom structure 10 is chosen to position the member 36 such that for a given speed of revolution of the helicopter rotor, the spinning blades will not interfere with reception of the GPS signals by the antenna.

An additional tubular member 46 is preferably secured to boom structure 10 to carry the cable 48 which joins the antenna 50 to onboard recording or transmitting devices. The cable 48 is extendable and retractable to enable the antenna 50 to be removed from the boom structure and placed in position on a point on the earth's surface.

To utilize the invention a known GPS initialization procedure such as antenna swap or known line is utilized. The helicopter is then moved to a position near a point for which a position is required. A crewman then removes the antenna 50 from the tubular mount 36 and places it in position on the point. Data is received and recorded for that point from the GPS satellites. The antenna, while continuously monitoring the GPS signal, is placed back in the tubular member 36 and the aircraft is moved to the next point for which the position is required. A crewman repeats the procedure, and the aircraft then moves on to the next point.

The aircraft will continue to maintain the predetermined minimum rotor speed to avoid interference with the GPS signal. As well, during flight, the pilot will fly in such a manner as to avoid bringing the aircraft fuselage between the antenna and the satellites.

Thus it is apparent that there has been provided in accordance with the invention a method and apparatus for utilizing a movable GPS antenna for surveying purposes that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. Apparatus for mounting on a rotary wing aircraft for supporting a Global Positioning Systems (GPS) receiving antenna, said apparatus comprising:
   a boom structure for being fixed to and extending laterally to a side of said aircraft;
   mounting means on said boom for cooperating with corresponding mounting means on said antenna for removably mounting said antenna on said boom; and
   cable receiving means extending between said aircraft and said antenna and associated with said boom structure for receiving a communications cable attached to said antenna, wherein said cable receiving means permits the extension or retraction of said communications cable for allowing said antenna to be removed from said boom while maintaining operative communication of said antenna with said aircraft.

2. The apparatus of claim 1 wherein said boom structure comprises a group of elongated tubular members supported at their inner ends on said aircraft and which are interconnected at their outer ends, and a series of support cables for supporting and stabilizing said tubular members.

3. The apparatus of claim 1 wherein said mounting means on said boom comprises a vertically oriented tubular member for receiving a cooperating member on said antenna.

4. The apparatus of claim 3 wherein said vertically oriented member includes means for locking said cooperating member in position in or on said vertically oriented tubular member.

5. The apparatus of claim 4 wherein said means for locking comprises a pin for engagement in aligned openings in said vertically oriented tubular member and said cooperating member.

6. The apparatus of claim 5 wherein said pin is spring loaded.

7. The apparatus of claim 1 wherein said cable is a coaxial antenna cable.

8. The apparatus of claim 1 wherein said cable receiving means comprises an additional elongated tubular member secured to at least one of said group of tubular members, said additional member being for receiving and permitting relative longitudinal movement of said cable through the interior of said additional member.

9. The apparatus of claim 2 wherein said aircraft includes a fuselage and a pair of landing skids and wherein said group of elongated members comprises first and second members extending outwardly and upwardly from first and second points in a lower part of said fuselage, and a third member extending rearwardly from said outer ends of said tubular members to a third point on an upper part of said fuselage.

10. The apparatus of claim 9 wherein said series of support cables includes a first crossed pair of cables extending between positions intermediate inner and outer ends of said first and second members respectively to said second and first points in said fuselage; a second pair of cables extending from said positions intermediate said ends to a point intermediate first and second ends of an adjacent said skid; and a third pair of cables extending from said points intermediate said ends to a point on an upper part of said fuselage.

11. The apparatus of claim 10 including a triangular spreader structure comprising three tubular members extending between said positions intermediate the ends of said first and second members, and between said positions and an adjacent position on said third member.

12. The apparatus of claim 11 wherein said first, second and third members are reinforced at said positions.

13. Apparatus for mounting a Global Positioning Systems (GPS) receiving antenna on a rotary wing aircraft having a series of rotor blades mounted on a rotary wing assembly, said apparatus comprising:
   a boom structure for being fixed to and extending laterally to a side of said aircraft and downwardly of said rotary wing assembly; and
   mounting means on said boom structure for cooperating with corresponding mounting means on said antenna for removably mounting said antenna on said boom;
   wherein said mounting means on said boom is positioned outwardly of said aircraft and below said rotor blades at a distance from said aircraft such that for a non-zero speed of rotation of said rotor the rotor blades will not interfere with the reception of signals from a GPS satellite by said antenna.

14. The apparatus of claim 13 wherein said boom structure comprises a group of elongated tubular members supported at their inner ends on said aircraft and interconnected at their outer ends and further comprises a series of support cables for supporting and stabilizing said tubular members.

15. The apparatus of claim 14 wherein said mounting means on said boom comprises a vertically oriented tubular member for receiving a cooperating member on said antenna.

16. The apparatus of claim 15 wherein said vertically oriented member includes means for locking said cooperating member in position in or on said vertically oriented tubular member.

17. The apparatus of claim 16 wherein said means for locking comprises a pin for engagement in aligned openings in said vertically oriented tubular member and said cooperating member.

18. The apparatus of claim 17 wherein said pin is spring loaded.

19. The apparatus of claim 14 wherein said boom structure comprises, in addition, means for supporting a communications cable extending between said aircraft and said antenna.

20. The apparatus of claim 19 wherein said cable is a coaxial antenna cable.

21. The apparatus of claim 19 wherein said means for carrying comprises an additional elongated tubular member for receiving said cable through the interior thereof, said additional member being secured to at least one of said group of tubular members.

22. The apparatus of claim 14 wherein said aircraft includes a fuselage and a pair of landing skids and wherein said group of elongated members comprises first and second members extending outwardly and upwardly from first and second points in a lower part of said fuselage, and a third member extending rearwardly from said outer ends of said tubular members to a third point on an upper part of said fuselage.

23. The apparatus of claim 22 wherein said series of support cables includes a first crossed pair of cables extending between positions intermediate inner and outer ends of said first and second members respectively to said second and first points on said fuselage; a second pair of cables extending from said positions intermediate said ends to a point intermediate first and second ends of an adjacent said skid; and a third pair of cables extending from said points intermediate said ends to a point on an upper part of said fuselage.

24. The apparatus of claim 23 including a triangular spreader structure comprising three tubular members extending between said positions intermediate the ends of said first and second members, and between said positions and an adjacent position on said third member.

25. The apparatus of claim 24 wherein said first, second and third members are reinforced at said positions.

26. Apparatus for mounting on a rotary wing aircraft for supporting a Global Positioning Systems (GPS) receiving antenna, said apparatus comprising:
 a boom structure for being fixed to and extending laterally to a side of said aircraft;
 mounting means on said boom for cooperating with corresponding mounting means on said antenna for removably mounting said antenna on said boom;
 cable receiving means extending between said aircraft and said antenna and associated with said boom structure for receiving a communications cable attached to said antenna, wherein said cable receiving means permits the extension or retraction of said communications cable for allowing said antenna to be removed from said boom while maintaining operative communication of said antenna with said aircraft; and
 wherein said mounting means on said boom is positioned outwardly of said aircraft and below said rotor blades at a distance from said aircraft such that for a non-zero speed of rotation of said rotor blades the rotor blades will not interfere with the reception of signals from a GPS satellite by said antenna.

* * * * *